(12) United States Patent
Inoishi (10) Patent No.: US 8,085,809 B2
(45) Date of Patent: Dec. 27, 2011

(54) CODEC CONVERTER, GATEWAY DEVICE, AND CODEC CONVERTING METHOD

(75) Inventor: Mitsuru Inoishi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 135 days.

(21) Appl. No.: 12/366,841

(22) Filed: Feb. 6, 2009

(65) Prior Publication Data

US 2009/0268755 A1 Oct. 29, 2009

(30) Foreign Application Priority Data

Apr. 23, 2008 (JP) .................................. 2008-112900

(51) Int. Cl.
*H04J 3/16* (2006.01)
(52) U.S. Cl. ..................... 370/466; 370/401; 370/476
(58) Field of Classification Search .................. 370/401, 370/465–467, 474–476, 412, 513
See application file for complete search history.

(56) References Cited

U.S. PATENT DOCUMENTS

| | | | | |
|---|---|---|---|---|
| 7,715,365 | B2 * | 5/2010 | Yoon et al. ..................... | 370/352 |
| 2002/0196762 | A1 * | 12/2002 | Choi et al. ..................... | 370/338 |
| 2003/0112758 | A1 * | 6/2003 | Pang et al. ..................... | 370/235 |
| 2004/0158647 | A1 * | 8/2004 | Omura .......................... | 709/249 |
| 2008/0080619 | A1 * | 4/2008 | Heng et al. ................ | 375/240.18 |
| 2010/0027528 | A1 * | 2/2010 | Davidson et al. ............ | 370/352 |

FOREIGN PATENT DOCUMENTS

| | | |
|---|---|---|
| JP | A-H08-018547 | 1/1996 |
| JP | 2005-033624 A | 2/2005 |
| JP | A-2007-049415 | 2/2007 |

OTHER PUBLICATIONS

Office Action dated Feb. 2, 2010 issued from Japan Patent Office in corresponding JP application No. 2008-112900 (English translation enclosed).
Complete English translation of Notification of Reason(s) for Refusal dated Feb. 2, 2010 issued from Japan Patent Office in corresponding JP application No. 2008-112900.

* cited by examiner

*Primary Examiner* — Gary Mui
(74) *Attorney, Agent, or Firm* — Posz Law Group, PLC (57) ABSTRACT

A codec converter includes: a plurality of codec converting units each configured to convert first encoded media data encoded using a first encoding mode into second encoded media data encoded using a second encoding mode different from the first encoding mode; a media data extracting unit configured to extract input-encoded media data from an input packet, and to generate conversion information that identifies a desired format conversion; a resource allocation unit configured to route the input-encoded media data to a selected one of the plurality of codec converting units based on the conversion information; and a packet reassembling unit configured to receive output-encoded media data from the selected one of the plurality of codec converting units, and to assemble the output-encoded media data into an output packet. Each of the plurality of codec converting units selects a different pair of first and second encoding modes.

20 Claims, 6 Drawing Sheets

DSP-1
20D

| NUMBER IN DSP | ADDRESS PORT NUMBER | CODEC CONVERSION |
|---|---|---|
| 1 | DstMac, SrcMac, DstIP SrcIP, Dstport, Srcport | G.711 → EVRC |
| 2 | EMPTY | G.711 → AMR |
|  |  |  |

| DSP SPECIFIED NUMBER | CODEC CONVERSION TYPE | BUILT-IN NUMBER | NUMBER OF EMPTIES |
|---|---|---|---|
| DSP-1 | G.711 → EVRC | 50 | 18 |
|  | G.711 → AMR | 50 | 22 |
|  | G.711 → G.722 | 50 | 35 |
|  | EVRC → G.711 | 50 | 16 |
|  | AMP → G.711 | 50 | 24 |
|  | G.722 → G.711 | 50 | 33 |
|  |  |  |  |

CODEC CONVERTER, GATEWAY DEVICE, AND CODEC CONVERTING METHOD

CROSS REFERENCE TO RELATED APPLICATION

The present application is related to Japanese Patent Application No. JP 2008-112900, filed on Apr. 23, 2008, the contents of which are incorporated herein by reference.

TECHNICAL FIELD

The present disclosure relates to a codec converter, a gateway device, and a codec converting method. In particular, it relates to a system and method that can be applied to a session border controller (S/BC) provided at a network border.

BACKGROUND

In an internet protocol (IP) interconnection environment, such as next generation network (NGN), data is exchanged between different personal computers (PCs) or terminals in business networks.

In data communication, a terminal or a PC is typically provided with software for opening files or data in a transmission mode and for supporting them. Accordingly, no problems generally occur with respect to simple data transmission between business networks (e.g., text, numbers, graphics, etc.).

Figure 2:
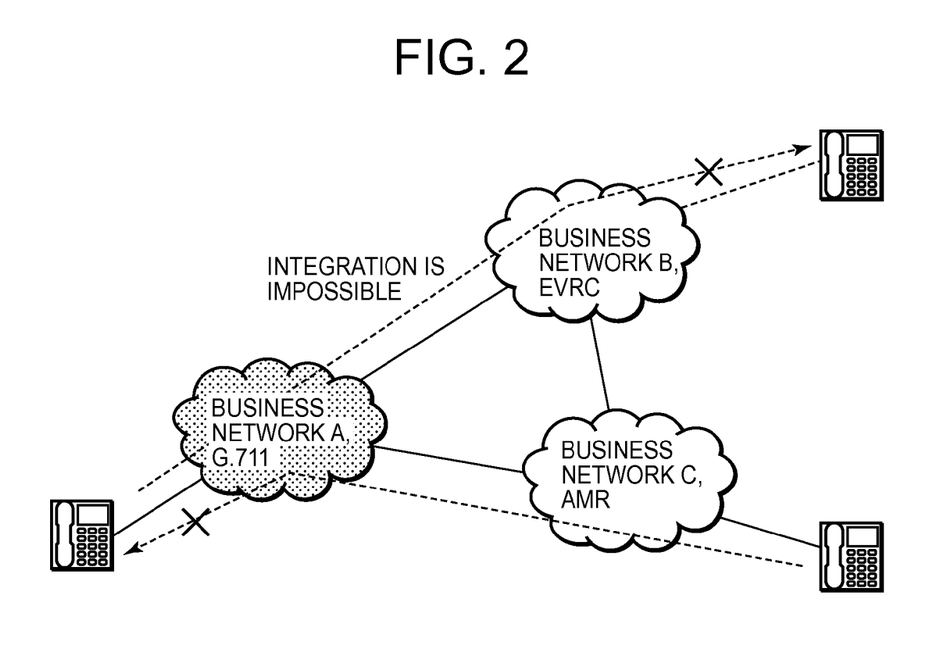
FIG. 2 is a diagram illustrating an IP interconnection needing codec conversion.

However, in a communication operation using an IP interconnection, media data such as audio or video data may be included in addition to simple data. Currently there is a problem with IP interconnections that include media data because there is no standardized codec among providers. In other words, each different business network may use a preferred codec, which may be different from a preferred network used by another business network. For example, as shown in FIG. 2, a business network A may employ an ITU-T G.711 codec, a business network B may employ an enhanced variable rate codec (EVRC), and a business network C may employ an adaptive multi-rate (AMR) codec. In this case, a phone terminal in business network A and a phone terminal in business network B cannot be interconnected to each other without performing a proper codec conversion.

As a first method for solving this problem of codec conversion, it is possible that a phone terminal could be provided with a codec corresponding to each business network it might connect to. However, this provides both a physical problem and a technical problem regarding whether or not the large number of phone terminals that are already in use in the market can be provided with this additional function.

For this reason, a second method for solving the problem in codec conversion has been proposed in which codec conversion is performed at a network border (i.e., at a border between business networks). In this way, the same method used for codec conversion in a phone terminal can also be applied to codec conversion performed at a border between phone terminals.

Figure 3:
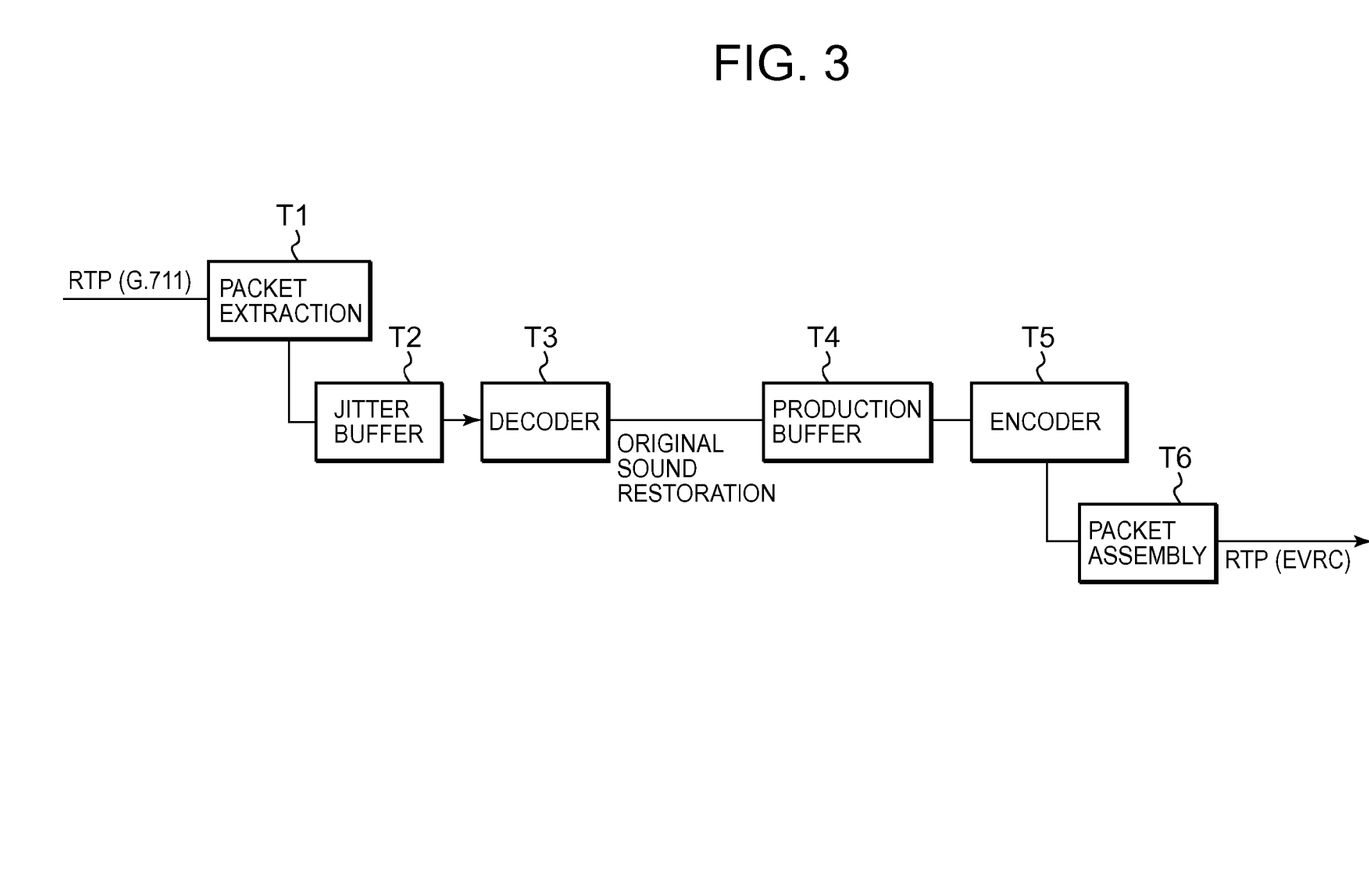
FIG. 3 is a diagram illustrating a codec converting method.

FIG. 3 is a diagram illustrating a codec converting method in the phone terminals (providing a conversion from G.711 into EVRC). In this method, encoded audio data is extracted from a real-time transport protocol (RTP) packet having audio data encoded according to G.711 (T1); jitter is adjusted by using a jitter buffer (T2); and the encoded audio data is decoded (T3) to restore original audio data. The original audio data is temporarily stored in a reproduction buffer, where interpolation of packet loss is performed (T4); encoding is performed according to an encoding mode (EVRC) for the post-conversion side (T5), and the encoded audio data is again inserted to the RTP packet (T6).

However, this second method, in which the codec conversion is performed at a network border between business networks, also has problems. These problems include: (a) the fact that various kinds of codec conversion may not be supported, (b) that there is no countermeasure against a simultaneous process over multiple channels, and (c) that a conversion process delay is not considered.

The second method is a method contrived to easily install the code conversion function (See, FIG. 3) corresponding to communication between two terminals, into a small-scale gateway device. In such an implementation, the aforementioned problems (a) to (c) may occur.

There are many kinds of business networks relating to IP interconnection (and therefore to a large number of codecs). Accordingly, when many kinds of codec conversion are not supported in the existing gateway device, another gateway device needs to be installed for many kinds of codec conversion. Therefore, the system will become complicated and large in size.

In IP interconnection, since there are a large number of channels connected between business networks it is performable that a single codec conversion device can correspond to such a large number of channels.

Real-time processing in communication is also important even in IP interconnection, and a media transmission delay including a codec conversion processing time must be kept to a minimum. In certain communications requirements (e.g., provision set forth by the Japanese Ministry of Internal Affairs and Communications or the like), target end-to-end delays (i.e., for the connection between a terminal of the business network A and a terminal of the business network B in FIG. 2) of audio communication are set to be within 100 ms. Similarly, the target end-to-end delay for video communication is set to be within 200 ms. This target value is a delay that does not make a user feel unnatural during communication and conversation. It is determined from subjective measurement. When the delay substantially exceeds the regulated value, conversational communication may deteriorate significantly, and the user is placed under stress.

In the above description, the problems relating to audio data have generally been described. However, the same problems are equally applicable to video data.

For this reason, it is desirable to provide a codec converter, a gateway device, and a codec converting method, that are capable of coping with multiple kinds of codec conversion and the simultaneous processing of a plurality of channels, while having a low delay.

SUMMARY

A codec converter is provided, comprising: a plurality of codec converting units each configured to convert first encoded media data encoded using a first encoding mode into second encoded media data encoded using a second encoding mode different from the first encoding mode; a media data extracting unit configured to extract input-encoded media data from an input packet, and to generate conversion information that identifies a desired format conversion; a resource allocation unit configured to route the input-encoded media data to a selected one of the plurality of codec converting units based on the conversion information; and a packet reassembling unit configured to receive output-encoded media data from the selected one of the plurality of codec converting units, and to assemble the output-encoded media data into an output packet, wherein the first encoding mode is chosen from a plurality of possible encoding modes, wherein the second encoding mode is chosen from the plurality of possible encoding modes, and wherein each of the plurality of codec converting units selects a different pair of first and second encoding modes.

Another codec converter is provided, comprising: a plurality of codec converting units, each including a decoder for decoding first encoded media data using a first codec mode to generate decoded media data, and an encoder which is associated with the decoder, for encoding the decoded media data using a second codec mode, which is different from the first codec mode, to generate second encoded media data, an output of the decoder being directly connected to an input of the encoder; a media data extracting unit for extracting input media data from an input packet and generating channel identification information for identifying a communication channel of the packet corresponding to the extracted input media data; a network buffer for temporarily storing the extracted input media data to adjust jitter of the buffered input media data; an information managing unit for storing management information identifying a correspondence between the channel identification information and the plurality of codec converting units; a resource allocation unit for allocating the buffered input media data to one of the plurality of codec converting units corresponding to the channel identification information of the media data; and a packet reassembling unit for assembling the second encoded media data output from the one of the codec converting units into a packet.

A codec converting method is provided, including: extracting media data from an input packet in a media data extracting unit; generating channel identification information in the media data extracting unit to identify a communication channel of the input packet based on the extracted media data; receiving channel identification information in an information managing unit; managing stored information in the information managing unit regarding which channel identification information corresponds to which of the plurality of codec converting units; adjusting a jitter of the extracted media data in a network buffer after storing the extracted media data; allocating the jitter adjusted media data to one of the plurality of codec converting units based on the stored information; decoding the jitter adjusted media data in a decoder of a codec converting unit to generate decoded media data; encoding the decoded media data in an encoder of the codec converting unit output from the corresponding decoder to generate converted media data; and assembling the converted media data into an output packet in a packet reassembling unit, wherein the encoder uses a second codec mode, which is different from a first codec mode used by the decoder.

DESCRIPTION OF THE PREFERRED EMBODIMENTS

Figure 4:
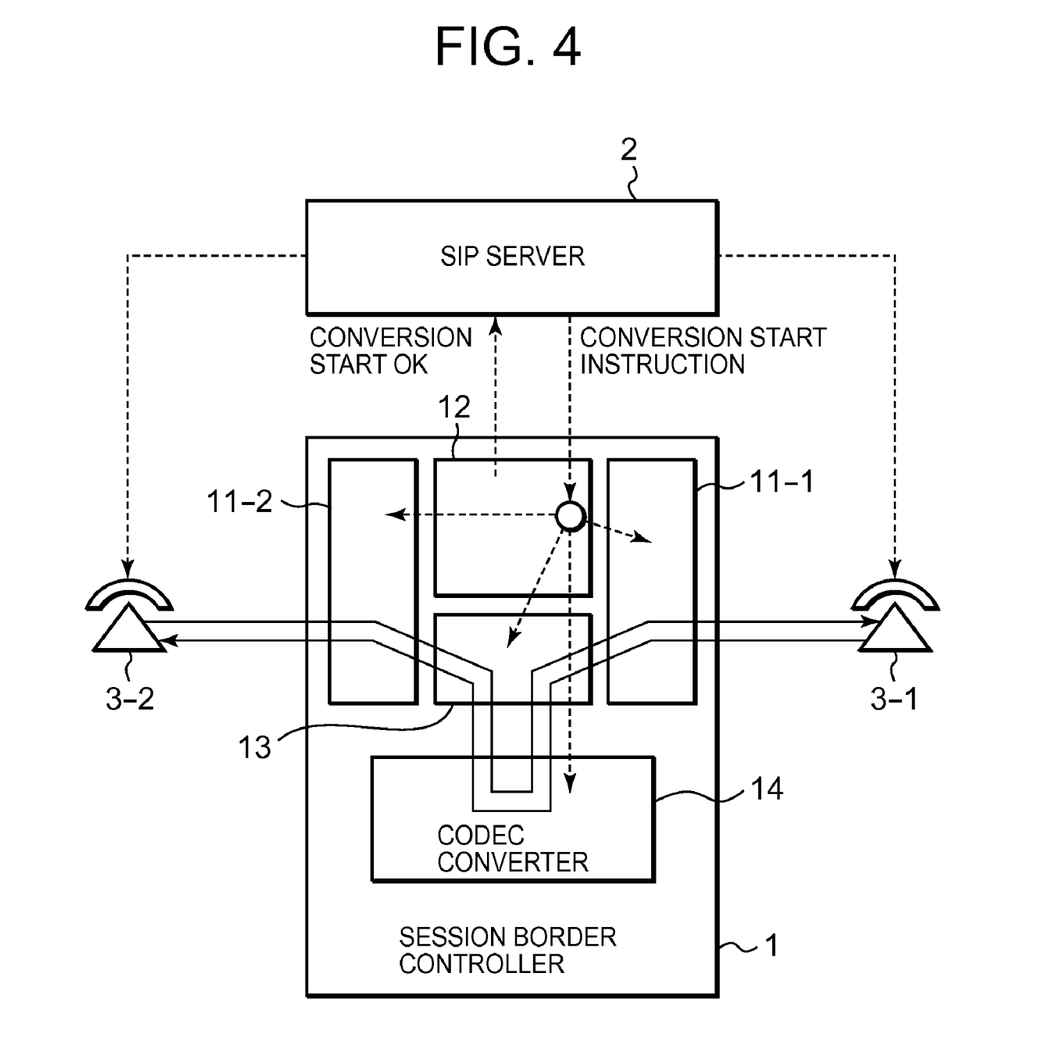
FIG. 4 is a block diagram illustrating a schematic internal configuration (imaginary configuration) of a session border controller according to a disclosed embodiment.

Hereinafter, embodiments of a codec converter, a gateway device, and a codec converting method will be described with reference to the drawings. The gateway device according to the disclosed embodiments is a session border controller.
Device Configuration FIG. 4 is a block diagram illustrating a schematic internal configuration (imaginary configuration) of a session border controller according to a disclosed embodiment.

A session border controller 1 according to the disclosed embodiment is provided at a network border between different business networks, and includes a plurality of interface units 11-1 and 11-2, a control unit 12, and a switch unit 13. The session border controller 1 performs functions such as topology hiding (THIG) and IP v4/v6 conversion (NAT/NAPT) pinhole control.

The session border controller 1 according to this embodiment also includes an internal or an external codec converter 14.

A session initiation protocol (SIP) server 2 operates as a call control server in a session establishment process of an SIP. It recognizes codecs (e.g., codecs employed by business networks having IP phone terminals 3-1 and 3-2), each of which is employed at IP phone terminals 3-1 and 3-2 for establishing telecommunication. When the codecs of both phone call terminals 3-1 and 3-2 are different from each other, the SIP server 2 sends an instruction to the session border controller 1 in order to perform codec conversion.

In the session border controller 1, the control unit 12 receives the codec conversion instruction from the SIP server 2, and then controls the interface units 11-1 and 11-2, the switch unit 13, and the codec converter 14 for performing the required codec conversion.

The control unit 12 controls the packet output from the IP phone terminal 3-1 to be transmitted through the interface unit 11-1 having the IP phone terminal 3-1 and the switch unit 13 to the codec converter 14, and controls the packet output from the codec converter 14 to be transmitted to the other IP phone terminal 3-2 through the switch unit 13 and the interface unit 11-2 having the IP phone terminal 3-2 to the other IP phone terminal 3-1. The control unit 12 also controls the codec conversion to be performed in a reverse direction.

When the performance of the codec conversion is ready, the control unit 12 sends a start OK signal to the SIP server 2. Upon receiving the start OK signal, the SIP server 2, in turn, notifies both IP phone terminals 3-1 and 3-2 that the phone call may proceed.

The packet relating to the telecommunication being started is then converted, through the codec converter 14, into a packet whose codec is employed by the corresponding IP phone terminal. Then the packet is transmitted to the corresponding IP phone terminal.

Figure 1:
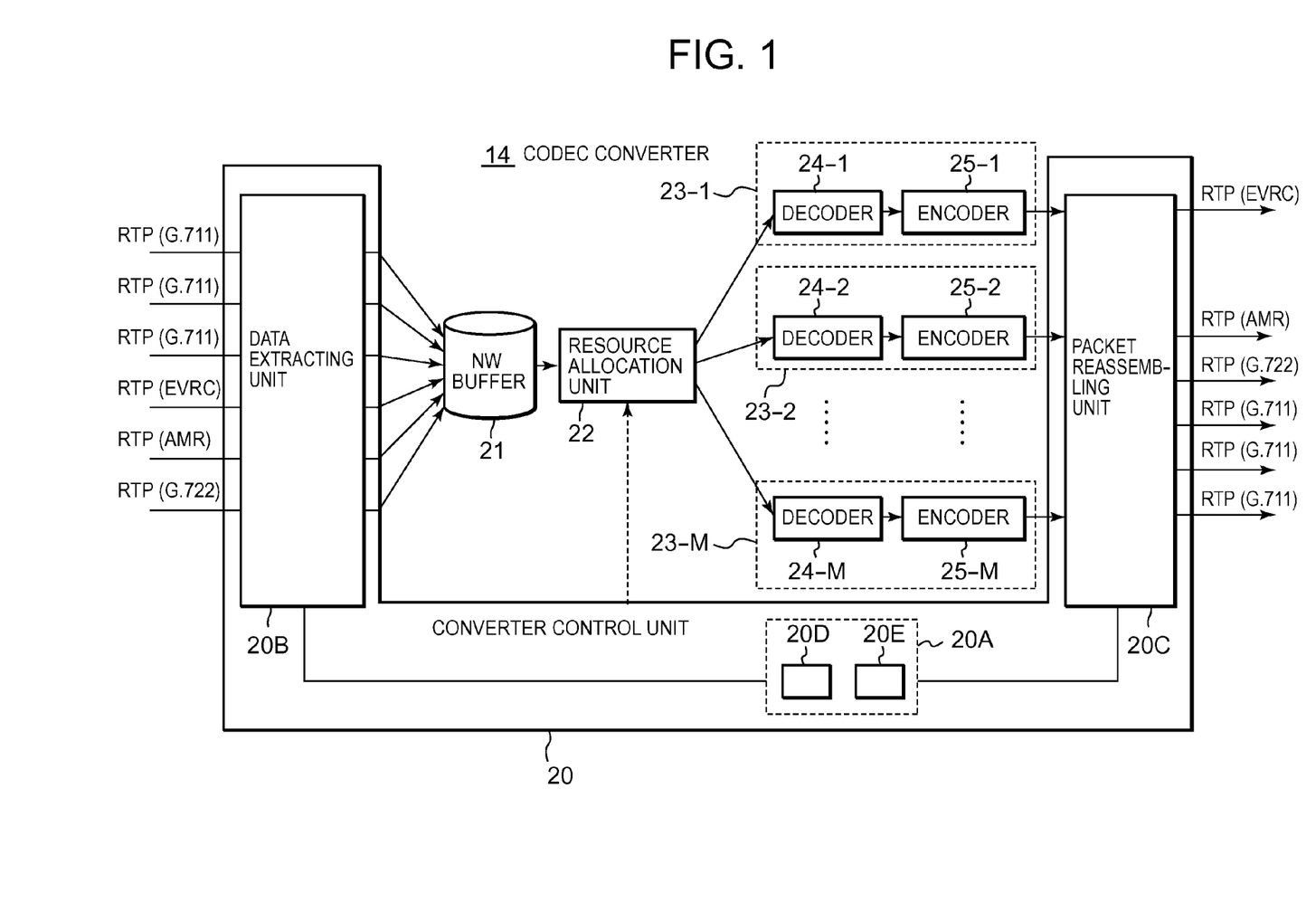
FIG. 1 is a block diagram illustrating a specific configuration of a codec converter according to a disclosed embodiment.

FIG. 1 is a block diagram illustrating a specific configuration of the codec converter 14 according to a disclosed embodiment. The codec converter 14 shown in FIG. 1 is provided at a network border between a first business network that uses a G.711 codec and a second business network that uses a different codec. It performs codec conversion on a packet to be transmitted to the other business network, converting from G.711 into EVRC, AMR, or G.722. Similarly, it also performs codec conversion on a packet transmitted from the second business network to the first business network, converting from EVRC, AMR, or G.722 into G.711. In other words, the exemplary codec converter 14 is capable of performing six kinds of codec conversion. In alternate embodiments other kinds of conversion can also be implemented (e.g., from EVRC into AMR, etc.).

In FIG. 1, the codec converter 14 includes a converter control unit 20, a network buffer (NW buffer) 21, a resource allocation unit 22, and a plurality of decoder-coder pairs 23-1 to 23-M. The converter control unit 20 includes an information managing unit 20A, a data extracting unit 20B, and a packet reassembling unit 20C. The information managing unit 20A includes an internal session management table 20D and a DSP management table 20E. Each of the decoders-coder pairs 23-1 to 23-M includes one of the decoders 24-1 to 24-M, and the corresponding one of the encoders 25-1 to 25-M.

The decoders 24-1 to 24-M each decode an input set of encoded audio data to restore the original audio data. In the present embodiment, a reproduction buffer is not provided at an output stage of the decoders 24-1 to 24-M (See, FIG. 3). Instead, the original audio data output from the decoders 24-1 to 24-M is directly transmitted to the corresponding encoders 25-1 to 25-M. The encoders 25-1 to 25-M each encode the original audio data on the basis of a set encoding mode (i.e., a codec mode). Codec conversion is determined depending on a combination of encoding modes used by a decoder-encoder pair 24-$i$ and 25-$i$ (where i is an index value that varies from 1 to M). For example, if the decoder 24-1 corresponds to G.711 and the encoder 25-1 corresponds to EVRC, that first decoder-encoder pair is provided for codec conversion from G.711 into EVRC. Other encoder-decoder pairs provide different conversions. In one embodiment, each of the decoder-coder pairs 23-1 to 23-M shares a common encoding/decoding mode. In other words, in each decoder-coder pair 23-$i$, either the decoder 24-$i$ or the encoder 25-$i$ has the same common encoding/decoding scheme (e.g., G.711).

The decoder-encoder pair 23-$i$ (i.e., 24-$i$ and 25-$i$) can be realized by a digital signal processor (DSP). In particular, a decoder-encoder pair for multiple channels (e.g., 200 channels) may be mounted on one DSP, and a number (e.g., 150 pieces) of DSPs may be provided.

In the disclosed embodiment, a local internal session number is allocated to each decoder-encoder pair 23-$i$ (i.e., each pair of decoder 24-$i$ and encoder 25-$i$). The internal session number includes a part for identifying the aforementioned DSP and a part that provides a unique number for performing classification in the DSP.

The converter control unit 20 determines decoder-encoder pair to be applied when a codec conversion start instruction is received from the SIP server 2, and codec conversion is necessary for a new SIP session. For example, the handling number in the corresponding device may be the internal session number, and the internal session number may correspond to the possible decoder-encoder pairs on a one-to-one basis. As noted above, the converter control unit 20 contains an information managing unit 20A having an internal session management table 20D, and a DSP management table 20E. It used the information stored in the internal session management table 20D and the DSP management table 20E to determine the internal session number (i.e., a number corresponding to the chosen decoder-encoder pair) that applies to a new channel relating to the codec conversion start instruction.

Figure 5:
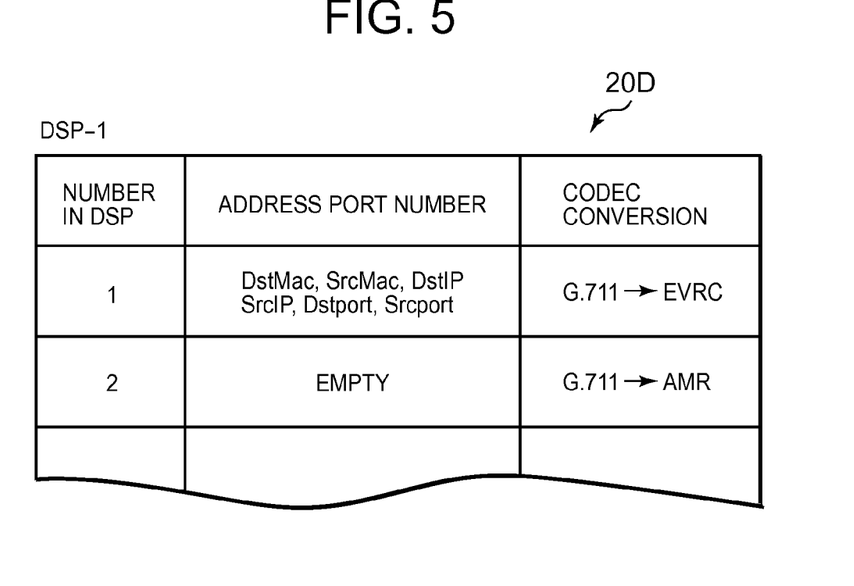
FIG. 5 is a diagram illustrating a configuration of a part of an internal session management table according to a disclosed embodiment.

FIG. 5 is a diagram illustrating a configuration of a part 20D1 of the internal session management table 20D relating to a first DSP. The internal session management table 20D is divided into a plurality of tables (which are themselves further divided into a plurality of separate elements), one for each DSP. Each table has a DSP identifier and a plurality of entries, and each entry includes several pieces in information. In the disclosed embodiment, each table entry includes a unique number element (i.e., a number in the DSP) used for performing classification in the DSP, an address port element (i.e., an address port number) relating to an IP packet provided for codec conversion, and a codec conversion element that provides an indication of a kind of codec conversion performed.

The DSP identifier identifies the associated DSP. For example, FIG. 5 shows "DSP-1" as the DSP identifier, which corresponds to the first DSP.

Both the DSP identifier and the coded conversion elements are fixed information. When an internal session is not applied to codec conversion, the address port element relating the IP packet is set as "empty". When an internal session is applied to codec conversion, the address port element includes a transmission destination media access control (MAC) address (DstMac) of an IP packet of a process target, a transmission source MAC address (SrcMac), a transmission destination IP address (DstIP), a transmission source IP address (SrcIP), a transmission destination port number (Dstport), and a transmission source port number (Srcport).

Figure 6:
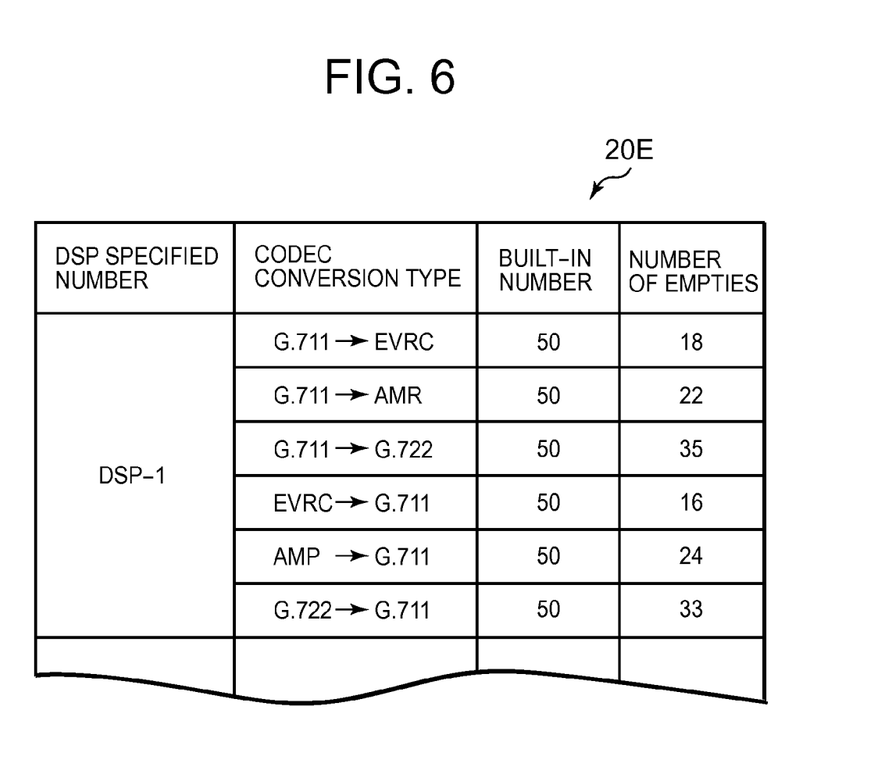
FIG. 6 is a diagram illustrating a configuration of a DSP management table according to a disclosed embodiment.

FIG. 6 is a diagram illustrating a configuration of the DSP management table 20E according to a disclosed embodiment. The DSP management table includes a number of data rows associated with each DSP identifier. For each DSP identifier, the DSP management table 20E includes one row for each kind of codec conversion that can be performed by the DSP. Each row includes a codec conversion type element that indicates the associated kind of codec conversion, a built-in number element that indicates the total number of conversion elements (i.e., conversion lines) of that kind of codec conversion provided in the associated DSP, and a number of empties element that indicates the number of conversion elements currently unused.

A method for allocating the internal session number is optional when the codec conversion start instruction is received at the session borer controller 1 from the SIP server 2. However, in the disclosed embodiment, the converter control unit 20, for example, determines a DSP having the largest number of empty conversion elements of the desired codec conversion kind needing allocation, or the largest number of unused (i.e., empty) conversion elements of the desired codec conversion kinds needing allocation on the basis of the contents stored in the DSP management table 20E. It then allocates the newest conversion element of the codec conversion kind whose address port element is identified as "empty" in the internal session management table 20D relating that DSP. Then, when this allocation is made, the number of empties element in the row for the current codec conversion kind corresponding to the current DSP is updated in the DSP management table 20E. Likewise, the address port element in the part of the internal session management table 20D relating to the current DSP is rewritten from "empty" to include the necessary numbers identified by the codec conversion start instruction.

In this case, the communication relating to the codec conversion start instruction from the SIP server 2 is a two-way communication between both phone terminals 3-1 and 3-2. As a result, two allocations of the internal session are performed.

When the IP packet provided for communication is input to the converter control unit 20, the data extracting unit 20B in the converter control unit 20 extracts the encoded audio data from the IP packet, recognizes the internal session number with reference to the internal session management table 20D, adds the internal session number to the extracted encoded audio data, and transmits the data to the network buffer 21. Generally, the audio IP packet is assembled using several layers such as a MAC layer, an IP layer, a user datagram protocol (UDP) layer, and an RTP layer. The data extracting unit 20B in the converter control unit 20 extracts the necessary RTP layer from the layers, allocates the internal session number from the input IP address, the RTP port number, or the like, and adds the internal session number as a header part of RTP. In recognition of the internal session number, for example, all the transmission destination MAC address (Dst-Mac), the transmission source MAC address (SrcMac), the transmission destination IP address (DstIP), the transmission source IP address (SrcIP), the transmission destination port number (Dstport), and the transmission source port number (Srcport) are not applied, but only the transmission destination IP address (DstIP), the transmission source IP address (SrcIP), and the transmission port number (Dstport) may be applied to shorten a searching time.

The network buffer 21 is provided to buffer a series of the encoded audio data to which the same internal session number is given into jitter buffers, and output the buffered encoded audio data to the resource allocation unit 22 at the same time interval.

The resource allocation unit 22, referring to the internal session management table 20D using the internal session number given to the encoded audio data as a key, recognizes the allocated decoder 24-i, and allocates the encoded audio data having the internal session number. As described above, in the disclosed embodiment channels do not correspond to internal sessions (i.e., decoder-encoder pairs) on a one-to-one basis.

The functions of the decoders 24-1 to 24-M and the encoders 25-1 to 25-M are as described above. All the decoders 24-1 to 24-M and the encoders 25-1 to 25-M output the processed data with the allocated internal session numbers attached. Accordingly, each of the encoders 25-1 to 25-M transmits encoded audio data having the internal session numbers to the packet reassembling unit 20C in the converter control unit 20.

Then, when encoded audio data having the internal session number is received from the encoder 25-i, the packet reassembling unit 20C in the converter control unit 20 refers to the associated internal session management table 20D using the allocated internal session number as a key. The packet reassembling unit 20C in the converter control unit 20 identifies the table entry associated with the internal session number, and extracts the associated transmission destination MAC address (DstMac), transmission source MAC address (SrcMac), transmission destination IP address (DstIP), transmission source IP address (SrcIP), transmission destination port number (Dstport), and transmission source port number (Srcport) It then adds this header information to the encoded audio data in place of the internal session number, recounts a frame check sequence (FCS), adds the frame check sequence to the end, and obtains and outputs the codec-converted IP packet.

Method of Operation

Omitting description of an operation of the session border controller 1 according to the disclosed embodiment, an operation of the codec converter 14 according to the disclosed embodiment will be described below with reference to FIGS. 5 to 7.

Figure 7:
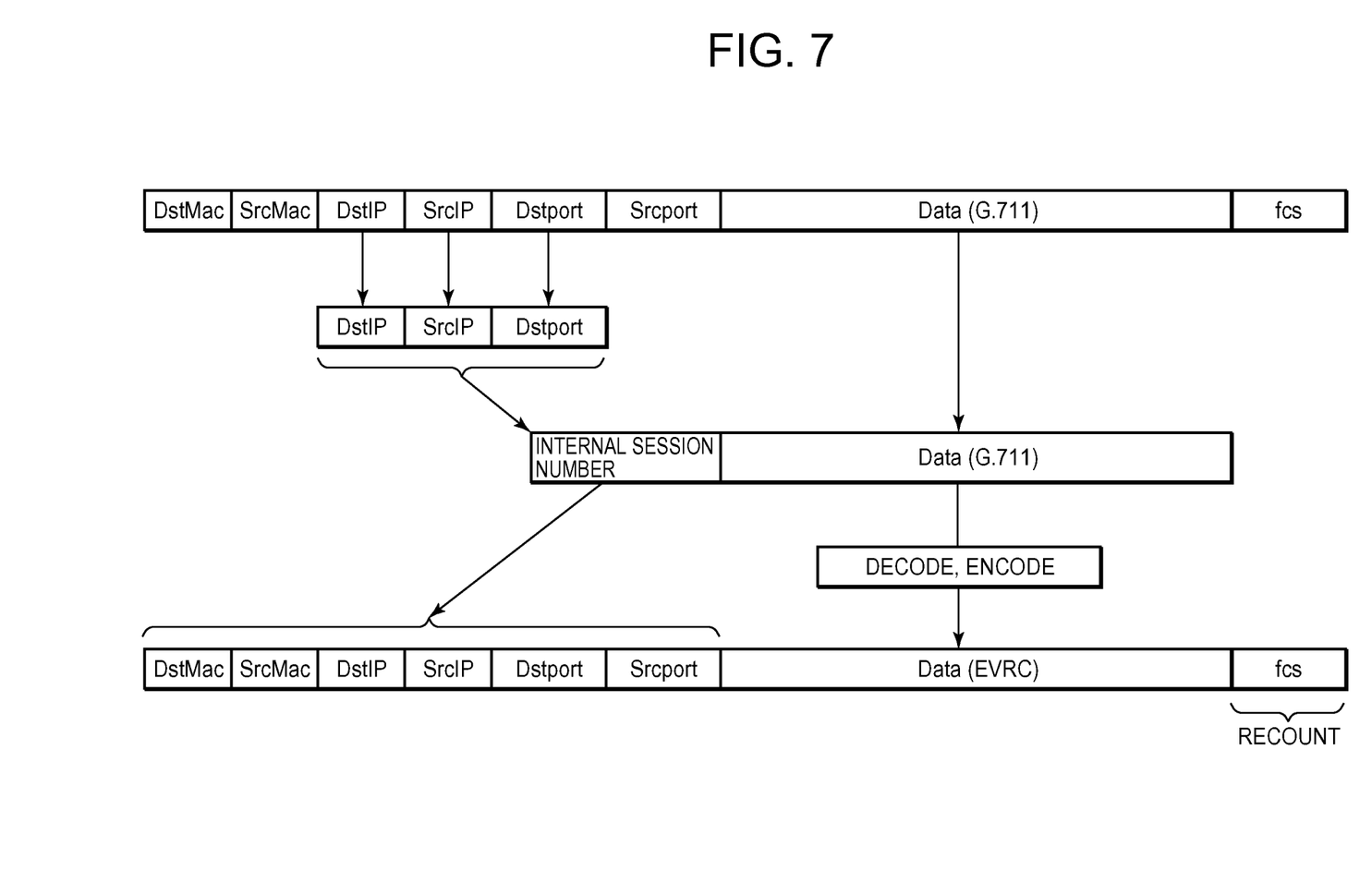
FIG. 7 is a diagram illustrating a process image of an IP layer according to a disclosed embodiment.

FIG. 7 is a diagram illustrating a processing image of an IP layer according to the disclosed embodiment. In this case, it is assumed that the codec before conversion is G.711, and the codec after conversion is EVRC. However, in alternate embodiments different pre-conversion and post-conversion codecs could be chosen.

In operation, the SIP session is first set, and an IP packet of the channel transferring to a phone call state is transmitted from the switch unit 13 (See, FIG. 4) to the codec converter 14. As described above, in this process the internal session for processing the IP packet of the channel is allocated at the time of transmitting the codec conversion start instruction from the SIP server 2, before transferring to the phone call state.

When the IP packet is input to the converter control unit 20 of the codec converter 14, the encoded audio data (G.711 in the example shown in FIG. 7) is extracted from the IP packet. As shown in FIGS. 6 and 7, the internal session number is identified using the transmission destination IP address (DstIP), the transmission source IP address (SrcIP), and the transmission destination port number (Dstport) in the IP packet, referring to the internal session management table 20D. The identified internal session number is then added to the extracted encoded audio data, and the data is transmitted to the network buffer 21.

A jitter of the encoded audio data, to which the internal session number is added, is then adjusted by being written into the network buffer 21 and then read from the network buffer 21.

The encoded audio data that is read from the network buffer 21 and has the internal session number is then allocated to an appropriate decoder 24-i. In particular, the internal session number is assigned to the decoder 24-i of the line of the internal session management table 20D that describes the internal session number to the resource allocation unit 22.

Accordingly, the encoded audio data attached to the internal session number is decoded into the original audio data by the decoder 24-i using a first coding/decoding mode (codec). The data is then decoded by the encoder 25-i corresponding to the decoder according to a second coding/decoding mode (codec). The details of the first and second codec can vary for each encoder-decoder pair 24-i and 25-i.

The encoded audio data (EVRC data in the embodiment of FIG. 7), output from the encoder 25-i and having the internal session number attached, is transmitted to the packet reassembling unit 20C in the converter control unit 20. There, the IP packet including the codec-converted encoded audio data is reassembled by the packet reassembling unit 20C. In other words, as shown in FIG. 7, the internal session number is replaced by the transmission destination MAC address (DstMac), the transmission source MAC address (SrcMac), the transmission destination IP address (DstIP), the transmission source IP address (SrcIP), the transmission destination port number (Dstport), and the transmission source port number (Srcport), on the basis of the contents stored in the internal session management table 20D. A frame check sequence (FCS) is newly recounted and the FCS is added to the end.

Operational Benefits

According to the disclosed embodiments, (a) it is possible to cope with many kinds of codec conversion; (b) it is possible to cope with simultaneous processing of multiple channels; and (c) a codec conversion process delay is low. The reason for these will be described below.

Since a plurality of a pair of the decoder 24-i and the encoder 25-i (i.e., codec conversion functions) is capable of performing different kinds of codec conversions, it is thus possible to cope with many kinds of codec conversions.

Since the encoded audio data relating to the input IP packet is allocated by the resource allocation unit 22, it is possible to cope with the simultaneous processing of multiple channels. Although each decoder-encoder pair 24-i and 25-i performs its process necessarily at the same time, a decoder-encoder pair 24-*i* and 25-*i* can be selected for each SIP session (channel). In other words, the combination between the channel and the decoder-encoder pair 24-*i* and 25-*i* is dynamic. Accordingly, the flexibility of the device is high, making it easy to cope with a large number of channels.

Since the internal session numbers are added and the channels are classified during the time from the process of extracting the encoded audio data from the input IP packet to the process of assembling the IP packet including the codec-converted encoded audio data, it is possible to simplify the assembling process of the channels. This makes it possible to reduce the codec conversion process delay.

In operation, the original audio data output from the decoder 24-*i* is immediately transmitted to the encoder 25-*i* and is recoded without passing through a reproduction buffer. This is because the codec converter 14 need not perform an operation performed in a terminal. As a result, no problem occurs even through the encoding process is performed immediately. And since there is no reproduction buffer, it is possible to reduce the codec conversion process delay.

In some devices, a reproduction buffer is provided for each session. Accordingly, buffer shortages can occur in the device, which can decrease the number of process channels. For example, the reproduction buffer may be used for a sequence change of packets based on an arrival sequence and packet number are not matched with each other and for packet interpolation for compensating packet loss.

The IP packet output from the border controller 1 (i.e., the codec converter 14), according to the disclosed embodiment, reaches the IP phone terminal provided at the end through any one business network. In other words, even if the codec converter 14 performs the sequence change of packets or the packet interpolation, there may be situations in which it is necessary to perform the sequence change of packets or the packet interpolation again using the IP phone terminal provided at the end.

In the embodiment disclosed above, many IP phone terminals, provided at one end, perform the sequence change of packets or the packet interpolation. Because of this, it is expected that these processes are performed by end-to-end terminals. As a result, the sequence change of packets or the packet interpolation is not performed in the codec converter 14, which means that the reproduction buffer is unnecessary, and so the codec conversion process delay is reduced.

Alternate Embodiments

In the embodiments described above, the media data provided for the codec conversion is audio data. However, alternate embodiments can apply the disclosed system and method for the codec conversion of video data as well.

In the embodiments described above, the codec converter 14 performs two-way codec conversion for communication. However, in alternate embodiments the codec converter 14 may perform only one-way codec conversion between two ways provided for communication. For example, in the connection relation of the business networks shown in FIG. 2, each business network may perform codec conversion only for the IP packet output from itself. Although configured as described above, this will cause no problem because the IP packet input to each business network has been already converted by the codec of another business network.

In the embodiments described above, the codec converter is built in the session border controller. However, in alternate embodiments, the codec converter may be built in another gateway device. In other embodiments, the codec converter may even be provided as a device independent from the gateway device, and the codec conversion may be performed under the control of the SIP server or the gateway device.

In the embodiments described above, the channels are classified in the codec converter 14 using internal session numbers. However, in alternate embodiments, the channels may be classified in the codec converter 14 using all or a part of the IP packet header.

What is claimed is:

1. A codec converter comprising:
    a plurality of separate codec converting units each configured to convert first encoded media data encoded using a first encoding mode into second encoded media data encoded using a second encoding mode different from the first encoding mode;
    a media data extracting unit configured to extract input-encoded media data from an input packet, and to generate conversion information that identifies a desired format conversion;
    a resource allocation unit configured to route the input-encoded media data to a selected one of the plurality of separate codec converting units based on the conversion information; and
    a packet reassembling unit configured to receive output-encoded media data from the selected one of the plurality of separate codec converting units, and to assemble the output-encoded media data into an output packet,
    wherein the plurality of separate codec converting units are arranged in parallel between the resource allocation unit and the packet reassembling unit,
    wherein the first encoding mode is chosen from a plurality of possible encoding modes,
    wherein the second encoding mode is chosen from the plurality of possible encoding modes, and
    wherein each of the plurality of separate codec converting units selects a different pair of first and second encoding modes.

2. The codec converter, as recited in claim 1,
    wherein each of the plurality of separate codec converting units shares a common encoding mode as one of the first and second encoding modes.

3. The codec converter, as recited in claim 1, wherein each of the plurality of separate codec converting units further comprises:
    a decoder configured to decode the first encoded media data to provide decoded media data; and
    an encoder configured to encode the decoded media data into the second encoded media data,
    wherein the decoded media data is directly input to the encoder.

4. The codec converter, as recited in claim 1, further comprising:
    a network buffer placed between the media data extracting unit and the resource allocation unit, configured to temporarily store the input-encoded media data before the input-encoded media data is provided to the resource allocation unit, to adjust a jitter of the media data.

5. The codec converter, as recited in claim 1,
    wherein the plurality of possible encoding modes includes at least two of: an ITU-T G.711 codec mode, an ITU-T G.722 codec mode, an enhanced variable rate codec (EVRC) mode, and an adaptive multi-rate (AMR) codec mode.

6. The codec converter, as recited in claim 1,
    wherein the plurality of separate codec converting units comprise one or more digital signal processors.

7. The codec converter, as recited in claim 1,
wherein each of the plurality of separate codec converting units is configured to simultaneously convert signals on a plurality of channels.

8. The codec converter, as recited in claim 1, further comprising
a management element containing one or more management tables,
wherein each of the one or more management tables includes management data relating to the plurality of separate codec converting units, and
wherein the resource allocation unit uses the management data to route the input-encoded media data to the selected one of the plurality of separate codec converting units.

9. A gateway device provided at a network border between a plurality of networks, the gateway device comprising the codec converter according to claim 1,
wherein the plurality of networks each employ a corresponding one of a plurality of network encoding modes chosen from the plurality of possible encoding modes, and
wherein the codec converter is configured to buffer signals between the plurality of networks.

10. A gateway device provided at a network border between a plurality of networks according to claim 9,
wherein each of the plurality of separate codec converting units further comprises:
a decoder configured to decode the first encoded media data to provide decoded media data; and
an encoder configured to encode the decoded media data into the second encoded media data, and
wherein the decoded media data is directly input to the encoder.

11. A codec converter comprising:
a plurality of separate codec converting units, each including a decoder for decoding first encoded media data using a first codec mode to generate decoded media data, and an encoder, which is associated with the decoder, for encoding the decoded media data using a second codec mode, which is different from the first codec mode, to generate second encoded media data, an output of the decoder being directly connected to an input of the encoder;
a media data extracting unit for extracting input media data from an input packet and generating channel identification information for identifying a communication channel of the packet corresponding to the extracted input media data;
a network buffer for temporarily storing the extracted input media data to adjust jitter of the buffered input media data;
an information managing unit for storing management information identifying a correspondence between the channel identification information and the plurality of separate codec converting units;
a resource allocation unit for allocating the buffered input media data to one of the plurality of separate codec converting units corresponding to the channel identification information of the media data; and
a packet reassembling unit for assembling the second encoded media data output from the one of the separate codec converting units into a packet.

12. The codec converter, as recited in claim 11,
wherein each of the plurality of separate codec converting units shares a common encoding mode as one of the first and second codec modes.

13. The codec converter, as recited in claim 11,
wherein the plurality of separate codec converting units comprise one or more digital signal processors.

14. The codec converter, as recited in claim 11,
wherein each of the plurality of separate codec converting units is configured to simultaneously convert signals on a plurality of channels.

15. A gateway device provided at a network border between a plurality of networks, the gateway device comprising the codec converter according to claim 11,
wherein the plurality of networks each employ a corresponding one of a plurality of network codec modes chosen from a plurality of possible codec modes, and
wherein the codec converter is configured to buffer signals between the plurality of networks.

16. The codec converter, as recited in claim 15,
wherein the plurality of possible codec modes includes at least two of: an ITU-T G.711 codec mode, an ITU-T G.722 codec mode, an enhanced variable rate codec (EVRC) mode, and an adaptive multi-rate (AMR) codec mode.

17. A codec converting method, including:
extracting media data from an input packet in a media data extracting unit;
generating channel identification information in the media data extracting unit to identify a communication channel of the input packet based on the extracted media data;
receiving channel identification information in an information managing unit;
managing stored information in the information managing unit regarding which channel identification information corresponds to which of the plurality of separate codec converting units;
adjusting a jitter of the extracted media data in a network buffer after storing the extracted media data;
allocating the jitter adjusted media data to one of the plurality of separate codec converting units based on the stored information;
decoding the jitter adjusted media data in a decoder of a codec converting unit to generate decoded media data;
encoding the decoded media data in an encoder of the codec converting unit output from the corresponding decoder to generate converted media data; and
assembling the converted media data into an output packet in a packet reassembling unit,
wherein the encoder uses a second codec mode, which is different from a first codec mode used by the decoder.

18. The codec converting method of claim 17,
wherein the channel identification information includes an internal session number identifying a selected one of the separate codec converting units used to generate the extracted media data.

19. The codec converting method of claim 17,
wherein the stored information includes information regarding the first and second codec modes, information regarding the capacity of each of the plurality of codec converting units, and information regarding the current status of the plurality of codec converting units.

20. The codec converting method of claim 17,
wherein the first and second codec modes each comprise one of: an ITU-T G.711 codec mode, an ITU-T G.722 codec mode, an enhanced variable rate codec (EVRC) mode, and an adaptive multi-rate (AMR) codec mode.

* * * * *